US010105917B2

(12) United States Patent
Schlegelmilch

(10) Patent No.: US 10,105,917 B2
(45) Date of Patent: Oct. 23, 2018

(54) OFF-ROAD VEHICLE TIRE REPAIR PATCH, KIT, AND METHOD

(71) Applicant: Marcus W. Schlegelmilch, Ravenna, OH (US)

(72) Inventor: Marcus W. Schlegelmilch, Ravenna, OH (US)

( * ) Notice: Subject to any disclaimer, the term of this patent is extended or adjusted under 35 U.S.C. 154(b) by 266 days.

(21) Appl. No.: 14/974,061

(22) Filed: Dec. 18, 2015

(65) Prior Publication Data

US 2017/0173899 A1  Jun. 22, 2017

(51) Int. Cl.
| | | |
|---|---|---|
| *B29C 73/14* | (2006.01) | |
| *B29C 73/30* | (2006.01) | |
| *B29K 627/06* | (2006.01) | |
| *B60C 13/00* | (2006.01) | |

(52) U.S. Cl.
CPC ............ *B29C 73/14* (2013.01); *B29C 73/305* (2013.01); *B29K 2627/06* (2013.01); *B60C 13/00* (2013.01); *B60C 2200/14* (2013.01)

(58) Field of Classification Search
CPC .......... B29C 73/08; B29C 73/12; B29C 73/14
See application file for complete search history.

(56) References Cited

U.S. PATENT DOCUMENTS

| | | | | | |
|---|---|---|---|---|---|
| 578,433 | A | * | 3/1897 | Wehl | B29C 73/08 81/15.7 |
| 734,108 | A | * | 7/1903 | Tingley | B29C 73/06 152/370 |
| 735,078 | A | * | 8/1903 | Felsing et al. | F16L 55/1651 138/98 |
| 1,215,719 | A | | 2/1917 | Sampson | |
| 1,294,322 | A | | 11/1919 | Swint | |
| 1,453,485 | A | * | 5/1923 | Vosburgh | B29C 73/14 152/370 |
| 1,497,297 | A | | 6/1924 | Lehr | |
| 5,350,481 | A | | 9/1994 | Shepard | |
| 6,013,343 | A | | 1/2000 | Radke | |

OTHER PUBLICATIONS

PCT ISA, International Search Report and the Written Opinion of the ISA, dated Mar. 2, 2017, 14 pages, WIPO-ISA/US, Alexandria, VA United States. attached document filename: MWS-101pct_ISR-WO.pdf.
U.S. Pat. No. 1,598 issued May 8, 1840 to Bulkley, "Leak Stopper".

* cited by examiner

*Primary Examiner* — Geoffrey L Knable
(74) *Attorney, Agent, or Firm* — Dwight A. Stauffer

(57) ABSTRACT

A patch kit and method for repairing a tear in a sidewall of an off-road vehicle tire includes an inside patch component, an outside patch component, and a compressing component for assembling, joining and compressing the inner and outer patch components together with the tire sidewall sandwiched therebetween. The compressing component is a threaded rod and a nut or bolt head to dispose on both ends. The inside and outside patch components are rigid or semi-rigid cupped shells with a hole for the threaded rod, so that the rod may pass through the patches and the tear for compression by tightening a nut. To facilitate tire repair without removing the tire from its rim, a recovery cable is temporarily connected to pull together repair components after they are separately pushed through the tear into the tire.

15 Claims, 2 Drawing Sheets patch kit on tire inside patch inside patch patch kit outside patch outside patch

OFF-ROAD VEHICLE TIRE REPAIR PATCH, KIT, AND METHOD

TECHNICAL FIELD

The invention relates to apparatus and techniques for repairing tires, particularly pneumatic tires, such as tubeless tires and, more particularly, to repairing tears, holes or openings (pneumatic defects) in sidewalls thereof.

The invention is more particularly applicable to tires for off-road vehicles (ORV), more particularly to all-terrain vehicles (ATV).

BACKGROUND

A tire is a ring-shaped vehicle component that may be mounted to a wheel rim to provide traction between the vehicle and the road while providing a flexible cushion that absorbs shock.

A pneumatic tire is an inflatable structure (carcass) having three main parts: a tread, a bead, and sidewall extending between them. Pneumatic tires are generally of two types: (i) "tube type" tires which require a separate inner tube to be inflated, and (ii) "tubeless" tires that may be inflated and with the bead sealed against the flanges of the wheel rim, and without a separate inner tube. In the main, hereinafter, tubeless tires will be discussed, particularly because ATV tires are mainly tubeless.

In a "flat tire" situation, damage occurs that breaches the carcass allowing air to escape, consequently compromising the ability of the tire to function properly. Except for special run-flat tires, a flat tire cannot be driven on. Even at very low speeds on a level roadway the tire is severely distorted as the sidewall is crushed between the rim and the tread or road surface and this will eventually cause the bead to unseat from the rim thus disassociating the ground-contacting tread from the rim rotating on the axle.

The most common types of tire damage may be generally categorized as either a hole (a.k.a. puncture), or a tear, and may be collectively referenced as "pneumatic defects".

A hole type of pneumatic defect is characterized as a roughly round through-passage, i.e., not significantly extended in any particular direction relative to the carcass wall. It may be caused by rolling over a sharply pointed object like a nail, and most often occurs in the tread part of the tire. A hole defect may be repairable by "plugging" the hole using any of a wide variety of commonly available tire plug kits. To be reliably repaired by plugging, the hole should be no more than 3/8" average "diameter", preferably less than 1/4" and must be in the tread area. Sidewall hole plugging is not reliable, for reasons including the thinner material and the flexing it undergoes.

A tear (rip, cut, slash, gash, slice, split and the like) type of pneumatic defect is characterized as a somewhat linear, longitudinally extended through-passage, typically irregularly shaped or jagged. It may be caused by sliding or rolling against/along a sharp object and most often occurs in the sidewall part of the tire. Especially for sidewall tears, the present art does not offer any reliable repair means or methods. The best available is a flexible patch that must be applied to the inside surface of the tire and somehow adhered/vulcanized to stay in place.

Plugging the tread of a tire can be done on a mounted tire as long as the wheel is rotated enough to make the hole accessible from the outside. However, with presently available repair materials any attempt to repair a tear in the sidewall of a pneumatic tire would involve: (i) raise (jack up) the vehicle sufficiently to remove the wheel (rim and tire) from the axle of the vehicle, (ii) remove at least one bead of the tire from the rim, (iii) apply a patch to the inner surface of the tire at the location of the defect, (iv) re-mount the tire on the rim, and (v) replace the wheel onto the axle of the vehicle. Such a procedure may be all but impossible to perform on an ORV out in the field.

The invention described herein may be primarily applicable to tires for "off-road" vehicles (ORV), such as 4-wheel ATV's (all terrain vehicles). Off-road vehicles may include:
  Sport Quad (common ATV, used to "play in the mud", rock climbing, "off-roading" and the like).
  UTV=utility/work/all purpose version of ATV. The UTV is a beefed up ATV—a.k.a. "side by side" because one or more bench seats are provided. It may also include useful accessories such as small truck bed, possibly a dumping bed, and so on according to need.
  large garden tractors, lawn mowers, snow blowers and the like, especially those big enough for riding are also ORV'S, but generally not subjected to severe conditions.

The ATV/UTV type of ORV is a vehicle designed for use anywhere other vehicles cannot go or have problems, i.e., rough terrain/poor to no roads (thus, an ORV tire). In addition to sport quad enthusiasts, users may include hunters, prospectors, geologists, remote construction site workers, and anyone transporting people/goods in wilderness/remote areas. Includes users towing a rugged trailer. Also commonly used by farmers.

Because of its type of use, an ATV is squat shaped (low and wide) to avoid tipping, and has tires with aggressive tread shape and large footprint (for traction, and to avoid sinking in mud). Other ORV's may use tires like this.

A typical ATV tire may be an 18" tire on a 12" rim. These tires may have a large footprint (wide tread), are typically operated at a pressure of between 5-10 psi to provide good traction in mud etc., and typically operate at relatively low speed use, on unpaved terrain. These tires may have a 2-ply sidewall, and are thus relatively flexible (as compared with car tires), which enables the sidewall to flex and to "wrap around" rocks, etc. The tire elastomer may be a relatively soft compound to add friction/grip as the tire "wraps around" objects in its path. Nevertheless, the sidewall may become torn. Some typical ATV tires are:
  AT205×80R11 (11" rim, 8" section width, 6.5" section height (sidewall height); and
  25-8-12 inch rated (12" rim, 25" tire overall height, 8" section width, which means a 6.5" section height).
The sidewall height may be only about 3" for an 18" tire on a 12" rim.

Terrain of use includes very rough rocky ground and/or serious mud, soft sand, shallow marshy areas, even a jungle. Because of this, tire damage is common, and may be either a puncture/hole (typically in the tread) or a tear/slash/cut (usually in the sidewall). A torn (slashed, cut, sliced) sidewall is a common problem resulting from when tire slides down on, or squeezes by, a sharp edged or pointed rock, a sharp object (e.g., a sharp stick) under the surface of mud, water or snow; and the like.

The ORV (ATV, UTV) user may be alone, or in a small group, far from civilization, with no roads for a rescue/repair vehicle. When the driver of an ATV experiences a flat tire, he/she may be far from the vehicle that brought the ATV to the nearest roadside unloading point (e.g., in a trailer or back of pickup truck with ramp), therefor he will need to drive the ATV out of the wild. However the ATV is generally not drivable with a flat tire (the undercarriage may drag on ground, and a tubeless tire will come loose from the rim with no pressure to hold it there). To make matters worse, in rough terrain it may be impossible to jack up the vehicle, let alone remove the wheel for repair. Besides, the excess weight and storage space needed to carry a spare tire or even a car jack generally makes that prohibitive.

Tire sidewall damage is much more of a problem than tread damage because puncture repair plugs are readily available, inexpensive, and simple to implement even in the field, however there is nothing available to effectively repair a tear in the sidewall, particularly in the field where the tire cannot be removed for internal patching. Tread/hole repair plugs are a resilient rod that is folded over a forked tool that is used to force the plug into the hole along with an adhesive/sealing compound. Desperate ORV users may attempt to repair a sidewall tear by cramming in several plugs but this generally won't hold air for long before the plugs wiggle loose and fall out.

Thus there is an unmet need for means and method of effective repair of tears in a tire, more particularly for tears or holes in a tire sidewall, and most particularly for emergency or field repair of off-road vehicle tires when the tire cannot be removed from its rim for interior repairs.

SUMMARY

It is a general object of the invention to provide a patch, kit and method for repairing pneumatic defects such as tears in the sidewall of a pneumatic tire, particularly a tubeless tire, more particularly an off-road vehicle (ORV) tire such as an all terrain vehicle (ATV) tire, thereby restoring the ability of the tire to hold compressed air—in other words, to restore the pneumatic integrity of the tire. The repair thus effected may be temporary but should enable the driver of the vehicle with the repaired flat tire to drive away from the location, which may be remote from any roads or roadside assistance. The repair may be permanent, at the discretion of the owner of the vehicle.

It is a further object of the invention to provide a technique for repairing pneumatic defects in the sidewall of a pneumatic tire, particularly a tubeless tire, without requiring dismounting the wheel from the axle of the vehicle, and without dismounting the tire from the rim.

According to the invention, generally, a kit for patching pneumatic defects such as tears in the carcass (or sidewall) of pneumatic tires may comprise an inside patch component an outside patch component and a compressing component for extending through the pneumatic defect and compressing the inside and outside patch components together with the tire sidewall sandwiched and compressed therebetween.

The inside and outside patch components may have central holes through which the compressing component extends.

The compressing component may comprise a threaded rod and two nuts, or may comprise a bolt (having a threaded shaft) and a single nut.

In order to facilitate installing the inside and outside patch components on the tire sidewall, without removing the tire from its rim, an outer end of the threaded rod of the compressing component may be adapted to temporarily connect to an inner end of a cable of a field repair tool component so that the threaded rod may be fully inserted through the sidewall tear into the tire, followed by the inside patch component which is strung on the cable. Once inside the tire, the cable may be used to pull the compressing component through the hole in the inside patch component and through the sidewall of the tire. With the threaded rod of the compressing component also extending through the hole in the outside patch component, the inside and outside patch components may be compressed together with the tire sidewall sandwiched therebetween.

An outer surface of the inside patch component may have a recess for retaining a nut (or bolt head) of the compressing component.

The inside and outside patch components may comprise curved rigid or semi-rigid (such as steel, or hard plastic, such as PVC) plates (or shells), which may be round or oval or oblong or elliptical. The inside patch component may have a smaller cross-dimension (e.g., diameter) than the outside patch component.

The inside and outside patch components may each have a layer of rubber on their inner, sidewall-facing, concave, cupped surfaces.

The inside patch component may be provided with an alignment feature projecting from its inner surface which can be inserted into the tear in the tire sidewall to ensure proper alignment of the inside patch component with respect to the outside patch component.

Some benefits of the invention, in its various embodiments, may include being able to repair a flat tire on an off-road vehicle without requiring special tools and without removing the tire from the rim.

Other objects, features and advantages of the invention may become apparent in light of the following descriptions of various embodiments thereof.

BRIEF DESCRIPTION OF THE DRAWINGS

Reference may be made to embodiments of the invention, non-limiting examples of which may be illustrated in the accompanying drawing figures (FIGs). Some elements in the figures may be exaggerated, others may be omitted, for illustrative clarity. Similar elements in various figures may be similarly numbered, such as element 215 being similar to element 115, the most significant digit(s) of the reference numeral may correspond to the figure number (such as FIG. "2"). Terms of orientation such as "top", "bottom", "left", "right", "front", "back", and the like may be used to indicate relative positions of elements with respect to one another, or portions of a given element with respect to one another. Any text (legends, notes, reference numerals and the like) appearing on the drawings are incorporated by reference herein.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different versions of an element 109 which are similar or related in some way but are separately referenced for the purpose of describing modifications to the parent element (109). Such relationships, if any, between similar elements in the same or different figures will become apparent throughout the specification, including, if applicable, in the claims and abstract.

Figure 1:
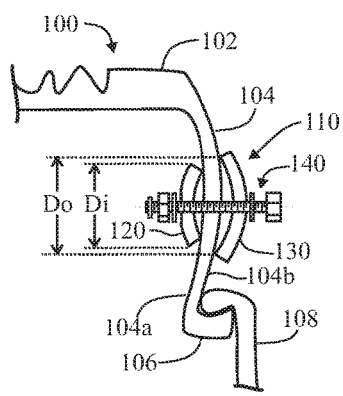

The structure, operation, and advantages of the present preferred embodiment of the invention will become further apparent upon consideration of the following description taken in conjunction with the accompanying drawings, wherein:

FIG. 1 is a diagram, in cross-sectional view, of a sidewall portion of a tire with a patch kit mounted thereto, section hatching omitted for clarity.

Figure 2:
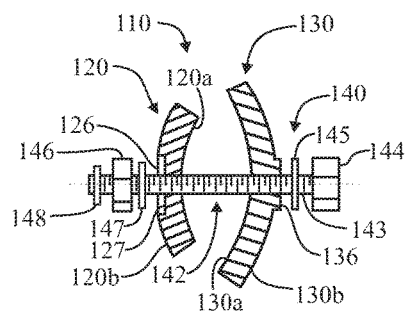

FIG. 2 is a diagram, in cross-sectional view, of a patch kit.

Figure 3A:
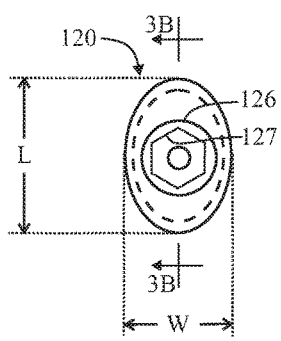

FIG. 3A is a diagram, in plan view, of an inside patch component of a patch kit.

Figure 3B:
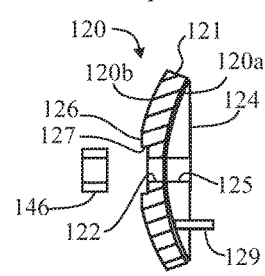

FIG. 3B is a diagram, in cross-sectional view, of the inside patch component of FIG. 3A, taken on a line 3B-3B through FIG. 3A.

Figure 4A:
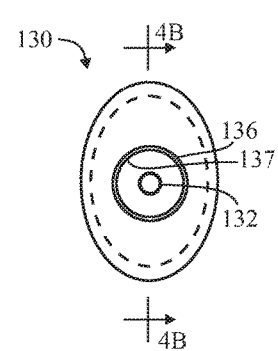

FIG. 4A is a diagram, in plan view, of an outside patch component of a patch kit.

Figure 4B:
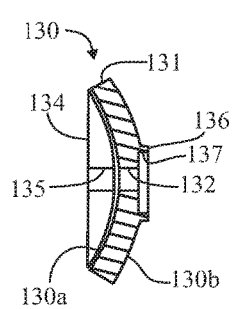

FIG. 4B is a diagram, in cross-sectional view, of the outside patch component of FIG. 4A, taken on a line 4B-4B through FIG. 4A.

Figure 5:
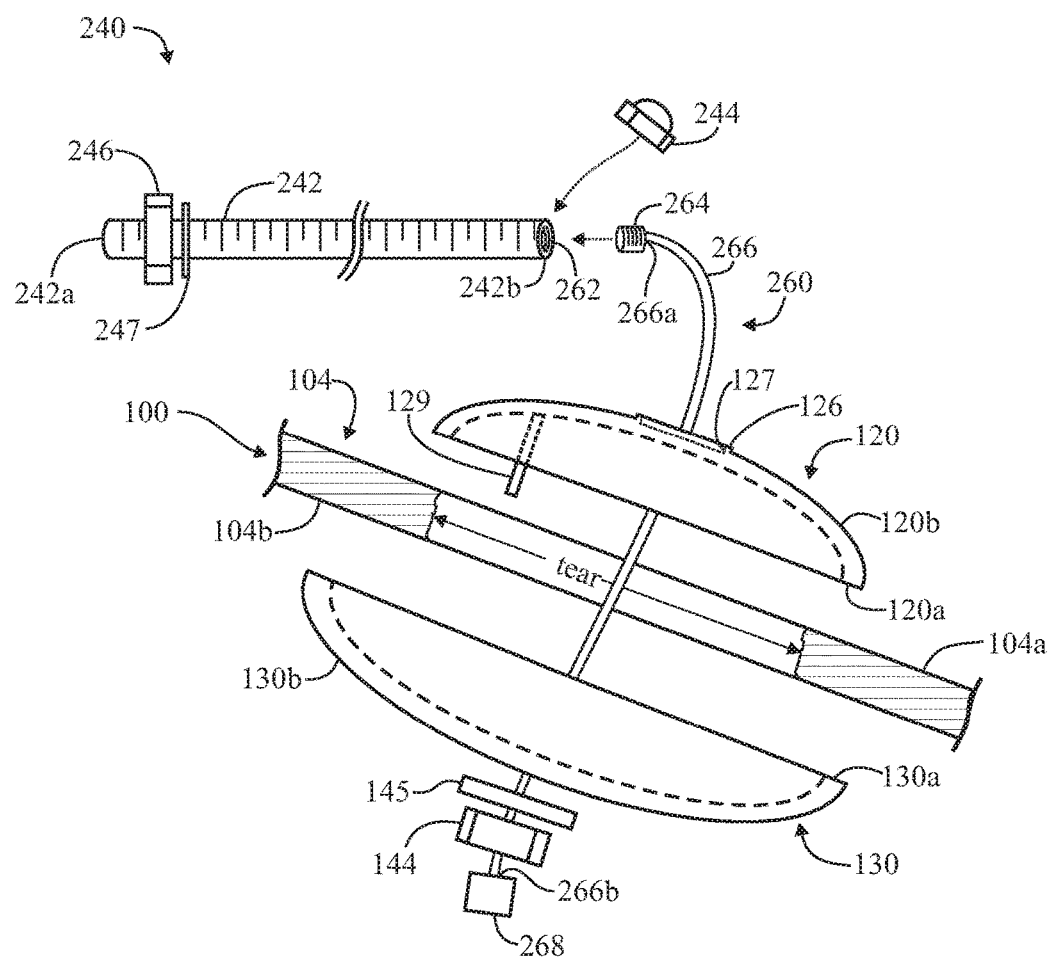

FIG. 5 is a diagram illustrating use of a field repair kit showing inside and outside patch components, with a tire sidewall therebetween, a compressing component, and a recovery cable component.

DETAILED DESCRIPTION

Various embodiments will be described to illustrate teachings of the invention(s), and should be construed as illustrative rather than limiting. Although the invention may be described in the context of various exemplary embodiments, it should be understood that it is not intended to limit the invention to these particular embodiments, and individual features of various embodiments may be combined with one another.

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated.

Some processes may be presented and described in a series (sequence) of steps. It should be understood that the sequence of steps is exemplary, and that the steps may be performed in a different order than presented, some steps which are described may be omitted, and some additional steps may be omitted from the sequence and may be described elsewhere.

FIG. 1 shows an exemplary pneumatic tire 100 having a tread 102, a sidewall 104 and a bead 106, and also shows a portion of a rim 108 to which the tire bead is mounted. The tire 100 may be a tubeless tire. FIG. 1 further shows a tire patch kit 110 in place on the sidewall 104 of the tire. FIGS. 2-4 show in greater detail the patch kit 110 and some of its components. FIG. 5 shows an embodiment of the patch kit 110 that includes components particularly suited for emergency or field repairs, wherein a "flat" tire 100 can be patched (repaired) without needing to separate the tire 100 from the rim 108, or the rim/wheel from the vehicle, and usually without needing to raise (jack up) the vehicle.

Although the present description is focused on repairs to tears in a sidewall, this merely indicates its primary use, and is not meant to exclude use of an appropriately dimensioned sidewall patch kit 110 to repair any kind of pneumatic defect (hole or tear) anywhere on the tire carcass. Only limitations of the disclosed patch structure that may be apparent to a knowledgeable and/or creative user apply. For example a sidewall hole may be treated as a short tear, and need only be large enough to allow passage of patch components therethrough. For example, a tear or hole in the tread may be repaired using the tire (sidewall) repair kit 110. Of course such a tread repair would not be roadworthy due to a bolt head protruding out of the tread, but it may enable driving out of an off-road area when no better repair method is available.

The patch kit 110, or kit for patching pneumatic defects such as tears or large holes in the sidewall 104 of pneumatic tires, such as ORV or ATV tires, may generally comprise the following components:

- an inside patch component 120 adapted in use to be disposed on (positioned against) an inner surface 104a of a tire sidewall 104;
- an outside patch component 130 adapted in use to be disposed on (positioned against) an outer surface 104b of a tire sidewall 104; and
- a compressing component 140 for inserting through the pneumatic defect in the tire sidewall and joining and compressing the inside 120, and outside 130, patch components together with the tire sidewall 104 sandwiched and compressed therebetween.

The inside and outside patch components may have a layer or mass of rubber 124, 134 (or elastomeric material, or any material suitable for providing an air-tight seal) on their inner (sidewall-facing) surfaces. In FIG. 1 (and in FIG. 2), the rubber is omitted, for illustrative clarity. The rubber is shown in the detailed views of FIGS. 3 and 4.

FIG. 2 shows the patch kit 110 without the tire 100. Here it can be seen that the inside patch component 120 may have an inner, sidewall-facing, concave, cupped surface 120a and an outer convex surface 120b. It can also be seen that the outside patch component 130 may have an inner, sidewall-facing, concave, cupped surface 130a and an outer convex surface 130b. The cupped inner surface 130a of the outside patch component 130 forms a cavity into which the sidewall 104 of the tire may be deformed.

Alternatively, the inner surface 120a of the inside patch component 120 may be convex, instead of concave, so that it may "nest" in the concave inner surface 130a of the outside patch component 130 (with the tire sidewall sandwiched therebetween). Conversely, the inner surface 130a of the outside patch component 130 may be convex, instead of concave, so that it may "nest" in the concave inner surface 120a of the inside patch component 120 (with the tire sidewall sandwiched therebetween).

Inside Patch Component

FIGS. 3A,B show some more details of the inside patch component 120.

A tear in the sidewall 104 of a tire may have a length of from ¾ to 4 inches or more, with around 1 inch being relatively common. As will be discussed below, the inside patch component 120 can be inserted edgewise through the tear in the sidewall 104, to the inside of a tire mounted on a rim, then manipulated so that its inner surface 120a lays flat against the inner surface 104a of the sidewall, covering the length of the tear.

The inside patch component 120 may comprise a curved (arcuate, convex, cupped) plate (or shell) 121 of a rigid or semi-rigid material such as PVC (polyvinylchloride) having a thickness of approximately ⅛ inch, for example. Other rigid or semi-rigid materials may be used.

The inside patch component 120 may be circular, having a diameter (or cross-dimension) Di of approximately 1 to 1½ inches (1" to 1.5") for example. The inside patch component 120 may be elongated, such as oval or oblong, such as elliptical, in which case it has a larger cross-dimension (e.g., major axis, or length L) and a smaller cross-dimension (e.g., minor axis, or width W). The inside patch component 120 may alternatively be rectangular, or any shape that is longer than it is wide, for example about 1.5 times longer L than it is wide W, or for example the length L may be about 1.3 to 2 times the width W. In general, the length L (or Di) of the inside patch component 120 must be sufficient to seal against uncut rubber beyond both ends of a longitudinal tear in the tire. Because of this obvious requirement, a range of patch sizes may be made available. The patch width W is not particularly critical. For example, a smaller width W is helpful for pushing the patch through the tear in the sidewall, but a larger width may help prevent twisting or other distortion.

The plate (or shell) 121 of the inside patch component 120 component may have a hole 122 through its center, extending from its inner surface 120a to the outer surface 120b thereof, for receiving a threaded rod 142 (e.g., of the compressing component 140). For very long patches, e.g., to cover tears longer than about 2.5 inches, a plurality of holes 122 may be spaced apart along the patch length to accommodate additional compressing component threaded rods 142.

The inside patch component 120 may comprise a layer (or liner) of rubber 124 disposed on the inner surface 120a of the plate/shell 121. A hole 125 may extend through the layer of rubber, coaxial with the hole 122, and may be sized to have an interference fit with (the hole is smaller than) a threaded rod 142 inserted therethrough. When the inside patch component 120 is assembled to the tire, the rubber may seal against the inside surface 104a of the tire sidewall 104, and may also seal around the threaded rod 142. (FIGS. 1 and 2 show the inside patch component without the rubber, for illustrative clarity.)

The outer surface 120b of the inside patch component 120 may have a flattened area 126 around the hole 122, and the flattened area may protrude as a boss for thickening the shell wall 121. The outer surface 120b may have a recess 127 for receiving a nut 146 (e.g., of the compressing component 140) which may be molded into the outer surface 120b of the inside patch component 120. The recess 127 may have a hexagonal shape, corresponding to the hexagonal shape of the nut 146, for retaining the nut and preventing it from turning. More generally, the nut 146 may be disposed on the outer surface 120b of the inside patch component 120. A sealing gasket 147 may be disposed under nut 146.

The compressing component 140 is described in greater detail hereinbelow, and generally comprises a threaded rod 142 which can extend through the tear in the sidewall, and through the inside and outside patch components 120, 130 to compress them onto the sidewall 104. Nuts 144, 146 (and washers or gaskets 145, 147) may be provided at either or both ends of the threaded rod 142. Alternatively, the threaded rod 142 could be a bolt, having a bolt head, rather than a nut, in which case the hexagonal head would take the place of the outside nut 144 or inside nut 146. and the threaded portion of the bolt would be a bolt shank 143.

The inside patch component 120 may have an alignment feature 129 extending from an inner surface thereof, away from the center thereof, such as on the major axis thereof (in the case of an oblong inside patch component), to allow for aligning the larger cross-dimension L (major axis) of the inside patch component 120 with an elongated pneumatic defect such as a longitudinal tear/cut in the sidewall 104 of the tire 100. The alignment feature 129 may be any structure (such as a fin, or a peg) protruding from the inside patch component 120 and capable of extending at least partially into the tear in the sidewall. The alignment feature 129 may be part of the shell 121, and may extend from an inner surface 120a of the shell through a hole in the rubber 124, if present. The outside patch component 130 may or may not have a corresponding or similar (or mating) alignment feature on an inner surface 130a thereof.

Outside Patch Component

FIGS. 4A,B show some more details of the outside patch component 130.

The outside patch component 130 may comprise a curved (arcuate, convex, cupped) plate (or shell) 131 of a rigid or semi-rigid material such as PVC (polyvinylchloride) having a thickness of approximately ⅛ inch, for example. Other rigid or semi-rigid materials may be used.

The outside patch component 130 may be circular, having a diameter (or cross-dimension) Do of approximately 1½ to 2¼ inches (1.5"-2.25") for example. The outside patch component 130 may be elongated, such as oval or oblong, such as elliptical, in which case it has a larger cross-dimension (e.g., major axis, or length L) and a smaller cross-dimension (e.g., minor axis, or width W). The outside patch component 130 may alternatively be rectangular, or any shape that is longer than it is wide, for example about 1.5 times longer L than it is wide W, or for example the length L may be about 1.3 to 2 times the width W. In general, the length L (or Do) of the outside patch component 130 must be sufficient to seal against uncut rubber beyond both ends of a longitudinal tear in the tire.

For covering a pneumatic defect in the sidewall 104 of a tire, the outside patch component 130 need not be inserted through the tear. Rather, it may simply be manipulated so that its inner surface 130a lays flat against the outer surface 104b of the sidewall, covering the length of the tear. With the inside patch component 120 similarly positioned covering the tear (on the inner surface 104a of the tire), the compressing component 140 can be used to compress the inside and outside patch components together, sealing the pneumatic defect (e.g., tear) in the tire sidewall 104 so that the tire can be re-inflated and used.

The plate (or shell) 131 of the outside patch component 130 may have a hole 132 through its center, extending from its inner surface 130a to the outer surface 130b thereof, for receiving a threaded rod 142 (e.g., of the compressing component 140). For very long patches, e.g., to cover tears longer than about 2.5 inches, a plurality of holes 132 may be spaced apart along the patch length to accommodate additional compressing component threaded rods 142.

The outside patch component 130 may comprise a layer (or liner) of rubber 134 disposed on the inner surface 130a of the plate/shell 131. A hole 135 may extend through the layer of rubber, coaxial with the hole 132, and may be sized to have an interference fit with (the hole is smaller than) a threaded rod (which may be a bolt shank) 142 inserted therethrough. When the outside patch component 130 is assembled to the tire, the rubber may seal against the outer surface 104b of the tire sidewall 104 and may also seal around the threaded rod 142. (FIGS. 1 and 2 show the outside patch component without the rubber, for illustrative clarity.)

The outer surface 130b of the outside patch component 130 may have a flattened area or boss 136 around the hole 132, (compare the flattened area or boss 126 on the outer surface 120b of the inside patch component 120) for receiving the head or outside nut 144 of the bolt or threaded rod 142 (e.g., of the compressing component 140). The outer surface 130b may have a recess 137 which may be molded into the outer surface 130b of the outside patch component 130. Alternatively, the nut 146 (inside nut) on the end of the compressing component 140 which is disposed inside the tire may be a bolt head, and the "bolt head" 144 on the end of the compressing component 140 which is disposed outside the tire may be a nut. Alternatively, both the inside nut 146 and the outside nut/bolt head 144 may be nuts. It may be advantageous to arrange the compressing component elements such that excess length of the threaded rod 142 will extend inside of the tire, thereby minimizing outward protrusions that could snag on vegetation, rocks, etc. as the ORV/ATV is driven.

As shown in FIG. 1, the inside patch component 120 may have a smaller cross-dimension (e.g., diameter) than the outside patch component 130. More particularly, the cross-dimension Di of the inside patch component 120 may be slightly less than the cross-dimension Do of the outside patch component 130. In this manner, the inside patch component 120 can "bite" into the portion of the tire sidewall 104 which is disposed between the inner and outer patch components as the sidewall is firmly and securely clamped therebetween. In other words, the pneumatic seal of the patch components with the tire sidewall may be improved by deforming the sidewall 104 into the cavity defined by the inner surface 130*a* of the outside patch component 130. Alternatively, the inside and outside patch components 120, 130 may have similar or equal cross-dimensions Di and Do. Or, the inside patch component 120 may have a larger cross-dimension Di than the outside patch component 130 cross-dimension Do, in which case the sidewall 104 may be deformed into the cavity defined by the inner surface 120*a* of the inside patch component 120. In the case of oblong patch components it may be noted that sidewall deformation as described will generally require that both the length L and the width W of each of the two patches must meet the relative cross-dimension requirements, i.e., Di references both L and W of the inside patch component 120 and Do references both L and W of the outside patch component 130.

Compressing Component

As shown in FIGS. 1 and 2, the compressing component 140 for assembling, joining and compressing the inner and outer patch components together (with the tire sidewall sandwiched therebetween), and assembling them to the tire, may comprise:

a bolt 142 having a threaded shank (shaft) 143 and a head 144 at one end thereof;

a nut 146, which may be a self-locking nut (e.g., NYLOC®), which may be retained on (or in, such as molded in) an outer surface 120*b* of the inside patch component 120, e.g., within a recess 127, that may be nut-shaped (e.g., hexagonal) to prevent the nut from turning;

optionally, a washer 145 (which may be a sealing gasket) disposed under the head 144 of the bolt 142;

optionally, a washer 147 (which may be a sealing gasket) disposed under the nut 146; and optionally, a retaining clip 148 disposed on the threaded rod (shank) 143 beyond (to the left of, as viewed) the nut 146.

For example, the bolt 142 may be a ¼"—20 bolt having a length of approximately 2 inches.

In an embodiment, the bolt 142 is used in a reversed orientation such that the bolt head is positioned against the outer surface 120*b* of the inside patch component 120 in place of an inside nut 146, and the nut is positioned against, optionally retained on, the outer surface 130*b* of the outside patch component 130 in place of the bolt head 144.

In an embodiment, the bolt 142 comprises a threaded rod 142, and the bolt head 144 comprises a nut 144.

In use, the bolt 142 may be:

inserted through the hole 132 in the outside patch component 130, with the head 144 of the bolt 142 disposed against the outer surface 130*b* of the outside patch component 130 (optionally with the sealing gasket 145 disposed therebetween), further inserted through the hole 135 in the rubber 134 of the outside patch component 130, further inserted through the pneumatic defect in the sidewall 104 of the tire 100, further inserted through the hole 125 in the rubber 124 of the inside patch component 120, and further inserted through the hole 122 in the inside patch component 120, and into the nut 146 (that may be retained in the cavity 127 of the boss 126 on the outer surface 120*b* of the inside patch component 120, optionally with the sealing gasket 147 disposed therebetween), whereupon the bolt 142 may be tightened (by turning the bolt head 144) to securely and air-tightly clamp the sidewall 104 of the tire between the inside and outside patch components 120, 130.

In this example, only the bolt head 144 will protrude outside the tire, and any excess shank length will protrude into the tire cavity.

Thereafter, the tire 100 may be inflated, and the driver can then drive away from the location where the flat tire was repaired. It is expected that this driving on the repaired tire will be at relatively low speeds such as in off-road use.

Regarding inflating the patched tire, there are various options:

the driver may have a portable electric (12v) air compressor, the driver may have a hand pump (such as a bicycle pump), the driver may have a can of pressurized gas (e.g. Fix-A-Flat™ tire inflator and sealer), the driver may have an apparatus for inflating a tire from engine compression (a fitting with a check valve screws into a spark plug hole, and the driver turns over the engine to create pressurized air.

From the forgoing description it should be apparent how to make a substantially equivalent tire repair using other embodiments of the components, such as, for example, a bolt 142 with the bolt head 144 positioned inside the tire, or a threaded rod 142 with an inside nut 146 and an outside nut 144.

Field Repair Tool and Kit

As described above, the inside and outside patch components may readily be applied to the inner and outer surfaces of the sidewall of a tire with the tire dismounted from the rim. As described herein, a special "field repair" tool 240 and technique may be used to mount the inside and outside patch components to the inner and outer surfaces of the sidewall without dismounting the tire from the rim, without removing the wheel (tire on the rim) from the ORV/ATV vehicle, and generally without even having to raise (jack up) the vehicle. Thus a tire repair patch kit that includes the field repair tool may be called a field repair kit.

Generally, the field repair tool 240 allows the inside patch component 120 to be inserted through the pneumatic defect (such as a tear or large hole) in the sidewall 104 of a tire 100 while it is still mounted on its rim 108 (without dismounting the tire from the rim). It may also be used on pneumatic defects in the tread 102, however the hereindescribed patch kit and repair method are mainly intended for use in sidewall defect repairs.

As described above (FIG. 2), the compressing component 140 may comprise:
- a bolt/threaded rod 142 having a head/nut 144 at one end thereof;
- optionally, a washer 145 (sealing gasket) disposed under the head/nut 144 of the bolt/threaded rod 142;
- a nut 146, which may be a self-locking nut which may be retained on or in an outer surface 120b of the inside patch component 120; and
- optionally, a retaining clip 148 on the threaded rod 142 beyond (to the left of, as viewed) the nut 146.

Some of the elements of the compressing component 140 may be replicated or substituted or have analogues in the field repair tool 240 described herein, which may also have additional elements not present in the compressing component 140.

A first component of the field repair tool 240 comprises a threaded rod 242 (compare threaded shank 143 of the threaded rod/bolt 142). The threaded rod 242 may have a length sufficient to extend through the inside patch component, the tire sidewall, and the outside patch component. For example, the threaded rod 242 may measure approximately 2 inches in length, may have a diameter of approximately ¼ inch, and may be externally threaded (such as 20 threads per inch).

The threaded rod 242 has two ends, an inner end 242a which (with the inside patch component 120) will be disposed inside the tire, and an outer end 242b which will be disposed outside of the tire.

In a manner similar to the threaded rod 142, a nut 246 (compare 146) is disposed on the threaded rod 242 at the inner end 242a thereof. A retaining clip (not shown, compare 148) may be disposed beyond the nut 246, and a sealing washer 247 (compare 147) may be disposed under the nut 246.

The inner end 242a of the threaded rod 242, with the nut 246 (and washer 247) may be inserted from outside the tire through the pneumatic defect (e.g., tear) in the sidewall 104 of the tire. Alternatively, the threaded rod 242 may be a bolt, having a head 246 (rather than a nut) on the inner end 242a thereof.

The field repair tool 240 of the kit further comprises a recovery cable component 260.

Unlike the bolt 142, the threaded rod 242 does not have a head (144) at the outer end 242b thereof. Rather, the outer end 242b of the threaded rod 242 may be provided with an internally-threaded bore (cavity) 262 extending into the outer end 242b thereof for receiving and temporarily connecting with an externally-threaded member 264 at an inner end 260a of a cable 266. An opposite, outer end 266b of the cable 266 may be provided with a handle 268 for grasping by a user.

Any suitable means may be used for temporarily connecting the threaded rod outer end 242b with the inner end 266a of the cable 266. For example, the inner end of the cable 266 may have an internally threaded sleeve (264) as temporary connection element for receiving and temporarily connecting with the externally-threaded outer end 242b of the threaded rod 242 (a temporary connection element 262). (This would require a hole 122 through the inside patch component 120 that is sufficient to allow passage of the sleeve therethrough).

In using the field repair tool 240 (and inside and outside patches 120, 130), the following preparatory steps may be performed. (Some steps may be re-arranged in their sequence.):
- the nut 246 may be screwed onto the inner end 242a of the threaded rod 242. (As mentioned above, the threaded rod 242 may be a bolt with a head 246 at the inner end thereof.) The washer/gasket 247 may be optionally included under the nut 246.
- string the inside patch component 120 onto the cable 266. The outside patch component 130 may also be strung onto the cable 266 at this time, or later.
- then temporarily connect the inner end 266a of the cable 266 with the outer end 242b of the threaded rod 242, for example by screwing the threaded member 264 at the inner end 266a of the cable 266 into the threaded bore 262 at the outer end 242b of the threaded rod 242.

Then, the following installation steps may be performed:

Step 1: Push the threaded rod 242 with the nut 246 at its inner end (or bolt, with a head 246 at its inner end) into and through the pneumatic defect (e.g., tear) in the sidewall such that the entire threaded rod 242 passes through into the interior of the tire. The inner end 266a of the cable 266 thus will also enter the tire. The outer end 266b of the cable 266 should remain dangling outside of the tire sidewall.

Step 2: Turn (manipulate) the inside patch component 120 (with the cable 266 extending therethrough) edgewise, and push it through the pneumatic defect (e.g., tear) into the interior of the tire 100. The cable 266 may be thin and flexible enough to allow turning the inside patch component 120 edgewise to push it through the pneumatic defect in the sidewall 104. If the pneumatic defect is too small to accept the inside patch component 120, the inside patch component 120 may be flexible enough to be slightly folded to fit through the pneumatic defect. Or, the user may choose to enlarge the pneumatic defect (e.g. using a knife) so that the inside patch component 120 may be inserted therethrough. There may be a plurality of patch sizes available so the user can select one small enough to pass through the tear but large enough to cover the length of the tear.

Step 3: After the inside patch component 120 is inside of the tire, the user can pull on the cable 266 (using the handle 268 if present) to pull (and manipulate) the threaded rod 242 (or bolt) through the hole 122 in the inside patch component 120, then further through the pneumatic defect in the sidewall 104 of the tire. The user may need to manipulate (jiggle) things a bit to cause the nut 246 to be seated in the hex cavity (127, see FIGS. 3A-3B) on the outer side 120b of the inside patch component 120, and the user will also want to pull cable 266 until the inside patch component 120 is pulled up firmly against the inner surface 104a of the tire sidewall 104.

Step 3a: At this stage, it may be important to align the inside patch component 120 properly, vis-à-vis the pneumatic defect (tear) in the sidewall of the tire. For example, if the pneumatic defect is a longitudinal tear, it may be important to align the inside patch component's major axis (longest cross-dimension L) with the direction of the tear. If present, the alignment feature 129 is designed to facilitate this alignment.

Step 4: Then the user can install the outside patch component 130 over the threaded rod 242 by inserting the outer end 242b of the threaded rod through the hole 132 in the patch component 130. This is the simplest method, but assumes that the outside patch component 130 is strung on the recovery cable 266. If not, then it can be installed in the next step after the cable is removed.

Step 4a: It is also important, in the case where both the inside and outside patch components are oblong, that the inside and outside patch components 120, 130 are aligned with one another to allow for one patch component 120 or 130 to deflect the tire sidewall 104 into the concave inner surface 130a or 120a of the other patch component 130 or 120.

Step 5: Securing the inside and outside patch components 120, 130 to the tire sidewall, and compressing the tire sidewall therebetween. The following steps may be performed.

The rod 242 should protrude out of the outside patch component 130, preferably enough to hold between the user's fingers (or the hole 132 in the outside patch component 130 may be just tight enough to hold the rod 242). At this stage, the cable 266 can be removed (unscrew 264 from 262).

Apply a cap nut 244 on the outer end 242b of the rod 242, and tighten until it is fixed on the outer end of the rod, effectively becoming a bolt head 244 (compare 144). Alternative: screw a short bolt into the threaded cavity 262 and tighten the bolt head 244 against the outer end of the rod.

continue tightening the cap nut/bolt head 244 so that the threaded rod 242 screws into the inside nut 246 until the patch assembly (240, 120, 130) is pulled together to sealingly clamp the tire sidewall between inside and outside patch components 120, 130.

Given the teachings set forth herein, many ways of manufacturing variations of this product and its manufacture may become apparent to one of ordinary skill in the relevant arts, and all such variations are to be considered within the scope of this invention.

While the invention has been described with respect to a limited number of embodiments, these should not be construed as limitations on the scope of the invention, but rather as examples of some of the embodiments. Those skilled in the art may envision other possible variations, modifications, and implementations that are also within the scope of the invention, based on the disclosure(s) set forth herein.

What is claimed is:

1. Method of field-repairing a tear in a sidewall of a pneumatic off-road vehicle tire, comprising the steps of:
   providing an inside patch component adapted to be positioned on an inner surface of the sidewall, and having a hole therethrough;
   providing an outside patch component adapted to be positioned on an outer surface of the sidewall, and having a hole therethrough;
   providing a compressing component for assembling, joining and compressing the inner and outer patch components together with the tire sidewall sandwiched therebetween;
   wherein the compressing component comprises a threaded rod having an inner end and an outer end;
   providing a recovery cable component having an inner end and an outer end;
   disposing an inner nut or bolt head on the inner end of the threaded rod;
   stringing the inside patch component onto the recovery cable component;
   connecting the inner end of the recovery cable component with the outer end of the threaded rod;
   pushing the threaded rod with the nut or bolt head on its inner end through the tear in the sidewall of the tire;
   pushing the inside patch component through the tear into the interior of the tire;
   pulling the threaded rod through the inside patch component hole and out through the tear;
   assembling the outside patch component and an outer nut or removable head on the threaded rod; and
   compressing the assembled components by tightening the outer nut or removable head.

2. The method of claim 1, further comprising:
   providing a first temporary connection element at the inner end of the recovery cable component and a second temporary connection element at the outer end of the threaded rod; and
   temporarily connecting the recovery cable component with the threaded rod.

3. The method of claim 2, wherein:
   the first temporary connection element comprises an externally-threaded member; and
   the second temporary connection element comprises an internally-threaded bore extending into the outer end of the threaded rod.

4. The method of claim 1, wherein:
   an outer surface of the inside patch component comprises a recess for retaining a nut.

5. The method of claim 1, wherein:
   the inside patch component comprises a rigid or semi-rigid shell with an inner, sidewall-facing, concave, cupped surface; and
   the outside patch component comprises a rigid or semi-rigid shell with an inner, sidewall-facing, concave, cupped surface.

6. The method of claim 1, further comprising:
   disposing a layer of rubber on the inner surface of the inside patch component; and
   disposing a layer of rubber on the inner surface of the outside patch component.

7. The method of claim 1, wherein:
   the inside patch component comprises a shell of PVC; and
   the outside patch component comprises a shell of PVC.

8. The method of claim 1, further comprising:
   extending an alignment feature from an inner surface of the inside patch component.

9. The method of claim 1, wherein:
   the inside patch component is longer than it is wide.

10. The method of claim 1, wherein:
    the inside patch component is elliptical, and has a major axis length that is approximately 1.3 to 1.5 times a minor axis width.

11. The method of claim 1, wherein:
    the inside patch component has a smaller cross-dimension than the outside patch component.

12. Method of field-repairing a tear in a sidewall of a pneumatic off-road vehicle tire, comprising the steps of:
    providing an inside patch component adapted to be positioned on an inner surface of the sidewall, and having a hole therethrough;
    providing an outside patch component adapted to be positioned on an outer surface of the sidewall, and having a hole therethrough;
    providing a compressing component for assembling, joining and compressing the inner and outer patch components together with the tire sidewall sandwiched therebetween;
    wherein the compressing component comprises a threaded rod having an inner end and an outer end;
    providing a recovery cable component having an inner end and an outer end;

disposing an inner nut or bolt head on the inner end of the threaded rod;
stringing the inside patch component onto the recovery cable component;
temporarily connecting the inner end of the recovery cable component with the outer end of the threaded rod;
pushing the threaded rod with the nut or bolt head on its inner end through the tear in the sidewall of the tire;
pushing the inside patch component through the tear into the interior of the tire;
pulling the threaded rod through the inside patch component hole and out through the tear;
assembling the outside patch component and an outer nut or removable head on the threaded rod; and
compressing the assembled components by tightening the outer nut or removable head.

13. The method of claim 12, further comprising:
stringing the outside patch component onto the recovery cable component.

14. The method of claim 12, further comprising:
aligning the inside patch component with the tear in the sidewall of the tire.

15. The method of claim 12, further comprising:
providing a nut shaped recess on an outer surface of the inside patch component for retaining the inner nut or bolt head.

* * * * *